United States Patent [19]
Reagan et al.

[11] 3,981,825
[45] Sept. 21, 1976

[54] HYDROCARBON CONVERSION CATALYST
[75] Inventors: William J. Reagan, Yardley, Pa.;
 Nai Y. Chen, Titusville, N.J.
[73] Assignee: Mobil Oil Corporation, New York, N.Y.
[22] Filed: June 7, 1974
[21] Appl. No.: 477,240

[52] U.S. Cl. ............... 252/455 R; 252/466 PT; 252/474; 208/138
[51] Int. Cl.² ............... B01J 21/04; B01J 21/12; B01J 23/42; B01J 23/52
[58] Field of Search .......... 252/466 PT, 474, 455 R; 208/138

[56] References Cited
UNITED STATES PATENTS

| | | | |
|---|---|---|---|
| 2,854,403 | 9/1958 | Weisz | 252/466 PT |
| 3,507,781 | 4/1970 | Spurlock et al. | 252/466 PT |
| 3,528,768 | 9/1970 | Tucker | 252/455 Z |
| 3,578,583 | 5/1971 | Buss | 252/466 PT |
| 3,718,578 | 2/1973 | Buss et al. | 252/466 PT |
| 3,789,020 | 1/1974 | Carter et al. | 252/466 PT |
| 3,789,024 | 1/1974 | Myers | 252/466 PT |
| 3,790,473 | 2/1974 | Rausch | 252/466 PT |
| 3,790,504 | 2/1974 | Duhaut et al. | 252/466 PT |
| 3,793,232 | 2/1974 | Duhaut et al. | 252/466 PT |
| 3,821,105 | 6/1974 | Mitsche et al. | 252/466 PT |
| 3,850,747 | 11/1974 | Sinfelt et al. | 252/466 PT |
| 3,901,827 | 8/1975 | Sinfelt et al. | 252/466 PT |

*Primary Examiner*—W. J. Shine
*Attorney, Agent, or Firm*—Charles A. Huggett; Raymond W. Barclay

[57] ABSTRACT

A metallic reforming catalyst, preferably consisting of platinum and iridium or compounds thereof, with or without a third metal component of either Groups IB, IIB, IIIA, IVA, VB, VIB or VIIB on a porous carrier provides excellent conversion of naphtha to $C_5^+$ product. A method of incorporating the metals or metal compounds on the carrier and preparing the finished catalyst using dimethyl sulfoxide is a novel procedure and provides unexpected catalytic properties. Novel reforming operations using these catalysts under moderate or severe conditions do not drastically alter the product yield.

8 Claims, No Drawings

HYDROCARBON CONVERSION CATALYST

BACKGROUND OF THE INVENTION

1. Field of the Invention

This invention relates to a novel catalyst and particularly to a novel reforming catalyst. It also relates to a method for producing the catalyst and to reforming operations employing the same.

2. Description of the Prior Art

Catalytic reforming is a well known petroleum refining procedure. Essentially, a naphtha feedstock is treated to improve the octane rating for use as a gasoline. A number of reactions occur in typical reforming. The naphthenic components are dehydroisomerized and dehydrogenated to aromatics. Paraffins are dehydrocyclized to naphthenes and aromatics; normal paraffins are isomerized to isoparaffins. The resulting product should be high in $C_5^+$ product (components having a boiling point of pentane or higher).

Catalysts containing platinum, such as platinum on alumina, are known and have been widely used in naphtha reforming. Catalysts containing platinum and tungsten on alumina by impregnation with water, benzene or ethyl alcohol solutions (U.S. Pat. No. 3,661,769) and platinum, iridium and tin on alumina or other porous carriers by impregnation with water, ether or alcohol solutions (U.S. Pat. No. 3,718,578) are also known. U.S. Pat. Nos. 3,528,768 and 3,630,966 have disclosed the use of dimethylsulfoxide to incorporate Group VIII and other metals with zeolites. Platinum-rhenium on alumina is another known commercial reforming catalyst (U.S. Pat. No. 3,558,479). Reforming catalysts are usually described as being selective, active and stable. Selectivity is the measure of the ability of a catalyst to produce aromatic compounds from naphthenes and paraffins; activity is the overall ability of a catalyst to convert the feedstock into $C_5^+$ product; catalyst stability enables the catalyst to remain selective and active over an extended period.

The catalysts of the present invention exhibit excellent properties in all of the aforesaid characteristics.

SUMMARY OF THE INVENTION

It has now been discovered that a stable, active catalyst consisting of at least two metals or compounds of metals of the platinum group, alone or with at least one metal of IB, IIB, IIIA, IVA, VB, VIB, or VIIB of the Periodic Table or compounds thereof, may be incorporated with a porous solid support using a nonaqueous polar solvent solution containing soluble compounds of said metals to provide excellent reforming conversion with $C_5^+$ yield. A novel method of preparing hydrocarbon conversion catalysts has also been discovered wherein a solution of compounds of two or more metals in dimethylsulfoxide (hereinafter referred to as DMSO) is mixed with a solid carrier and the resulting solids are recovered. A novel process for reforming a naphtha feedstock using the catalysts of this invention in the presence of sulfur has also been discovered.

DESCRIPTION OF SPECIFIC EMBODIMENTS

The catalysts of this invention consist of a solid porous support containing at least two metals or compounds of metals from the platinum group of metals: platinum, palladium, iridium, osmium, rhodium, and preferably although not necessarily, at least one metal from Groups IB, IIB IIIA, IVA, VB, VIB or VIIB, such as gallium, zinc, niobium, copper, silver, gold, tin, tungsten or rhenium. Thus, these catalysts may contain two, three, four or more metal components, provided at least two are of the platinum group. Most preferred of the platinum group are platinum and iridium. The catalysts may contain any variety of the aforesaid metals. Platinum-iridium-gold is the most preferred; platinum-iridium-tin, platinum-iridium-copper and platinum-iridium-rhenium are also useful catalysts. The amounts of each of the metals in such catalysts may range from 0.001 to 10:0.001 to 10:0.001 to 10 on a weight ratio. The total concentration of all metal components on the porous solid carrier is in the range of 0.005% to about 10% by weight, and preferably from 0.1% to 5%.

The solid porous carrier of this invention may be any inorganic solid, such as charcoal, or the inorganic oxides, such as alumina, silica, magnesia, thoria, boria, zirconia, aluminosilicates, such as zeolites, and the like. Mixtures of these may be used such as silica and alumina, magnesia and alumina, magnesia and zirconia, alumina and boria, alumina and aluminosilicate, silica and magnesia, silica, alumina and magnesia and the like. Alumina is a desirable carrier for reforming catalysts, and is preferred in the invention.

The catalysts of this invention are very active reforming catalysts, hence conditions of operation may be severe. While normal liquid hourly space velocity (LHSV) or the volume of liquid feed per hour through the catalyst is from 0.5 to 5, or more usually 1 to 3, the LHSV for catalysts of this invention may be the same or much higher and may even exceed 20. Alternatively, the feedstock may be less severely pretreated to remove sulfur than normally necessary. Sulfur has a poisoning effect on some reforming catalysts. The catalysts of this invention can tolerate a higher level of sulfur than such conventional reforming catalysts. In fact, sulfur added to the catalyst or present in the reformer feedstock itself, measured as over 1 ppm in the reformer effluent, may even be desirable in this invention.

In part this activity and stability stems from the combination of platinum group and Group IB metals, particularly. Trimetallic catalysts prepared by customary practices, aqueous impregnation of carrier with metallic cations or anions, produce reformate of very good research octane numbers (R + O, or unleaded). However, catalyts prepared by our preferred method are even more active and have extraordinary stability.

Essentially, the most preferred method of preparation is to dissolve DMSO-soluble compounds of the selected metals in DMSO and combine with the carrier at from 20° to 200°C. The porous carrier, in the form of particles of reduced size, is added to the said DMSO solution, the metals and carrier being in suitable concentrations to obtain the desired metal ratios and weight percents. Preferably excess DMSO solution is used in this preparation. The mixture is stirred for from 30 minutes to about 10 hours, preferably under reflux conditions. While the mixing of the carrier with DMSO solution may be carried out at lower temperatures, i.e. room temperature, a preheated solution may also be effective. The solids are then filtered out, washed again in DMSO and, preferably, water, then dried and calcined at a temperature of from 300°C. to about 600°C., preferably 350°C. to 500°C. The water wash, normally not employed in aqueous impregnation methods, in a desirable step in this procedure. Soluble metal compounds are the halides, halide acids, nitrates, carbonates, ammines, ammine halides and the like.

If desired, one metal component may be incorporated with the carrier by any means, i.e. with DMSO or aqueous impregnation, and the resulting solid either directly or after drying and/or calcining incorporated with one or more different metals by DMSO solution. The solid is then dried and calcined after such treatment.

While not wishing to be limited to a particular theory underlying the distribution of the metals on the solid carrier, it is believed that the metals to some degree form an alloy, either a two-metal or three-metal alloy, which is uniformly distributed in the pores of the solid carrier. Perhaps the DMSO solution of metal compounds undergoes some interaction with the porous carrier as well as the DMSO forms a complex with one or more of the metals. The metal may wholly or in part exist in the form of the reduced metal or as the initial salt or as a sulfide remaining after the heating and possible decomposition of DMSO or as a compound of a DMSO-composition product. That an alloy may also be present is seen in the unusual activity and stability of the catalyst made by this preferred process. Analysis has established that the metals are present after the calcining step.

Alternative nonaqueous polar solvents which may be used in preparing the catalysts of this invention, in addition to DMSO, are sulfolane (or tetrahydrothiophene-1-dioxide), carbon disulfide, dimethyl formamide and acetonitrile.

Conventional methods of preparation generally include subjecting the carrier to aqueous impregnation by a solution containing water-soluble compounds of the metals, preferably halides or halide acids followed by drying and calcining the resulting product. The multi-metallic catalysts of this invention produced by this aqueous impregnation procedure provide less satisfactory reforming results than by the DMSO procedure.

The following examples will illustrate the novel and conventional preparations and use of the novel reforming catalysts of this invention. Percentages are on a weight basis, unless otherwise specified. Metal contents of the catalyst states in the examples may refer to the reduced metal or to metal compounds or both.

EXAMPLE 1

In a suitable reactor were dissolved 0.2323 gram of $H_2PtCl_6 \cdot 6H_2O$, 0.023 gram of $IrCl_3 \cdot 3H_2O$ and 0.05 gram of $HAuCl_4 \cdot 3H_2O$ in about 80 ml DMSO with stirring at room temperature. To the resulting solution was added 25 grams of eta-alumina which had been ground to less than 100 mesh (U.S. Sieve Series) and the slurry was stirred. A reflux condenser was placed on the reactor and the slurry was heated to reflux. As the temperature increased, the alumina changed in color from light tan to blue-gray. The slurry was maintained at 150°C. for 2 hours.

The mixture was cooled and the solids filtered off. The solids were washed with 30 ml of DMSO and then with 150 ml of water. The washed product was dried in house vacuum (20 in. Hg) at 120°C. for 16 hours. The dried product was calcined at 480°C. for 3 hours in flowing air. The finished product contained 0.35% platinum, 0.05% iridium and 0.1% gold, by weight.

EXAMPLE 2

Using the same procedure as in Example 1, 0.046 gram of $H_2PtCl_6 \cdot 6H_2O$, 0.032 gram of $IrCl_3 \cdot 3H_2O$ and 0.035 gram of $HAuCl_4 \cdot 3H_2O$ were dissolved in 40 ml of DMSO. This solution was mixed with 5 grams of the alumina. After the preparation was completed, the product contained 0.35% by weight each of platinum, iridium and gold.

EXAMPLE 3

In a suitable reactor, 0.47 gram of $H_2PtCl_6 \cdot 6H_2O$, 0.046 gram of $IrCl_3 \cdot 3H_2O$ and 0.134 gram of $CuCl_2 \cdot 2H_2O$ were dissolved in 65 ml of DMSO. The DMSO solution was combined under vacuum with 50 grams of the alumina which had been previously calcined. The mixture was then refluxed and the solids worked up as in Example 1. After the preparation was completed, the product contained 0.35% platinum, 0.05% iridium and 0.1% copper, by weight.

EXAMPLE 4

A product similar to that of Example 2, containing equal amounts of the three metals, 0.35% by weight each, was prepared by dissolving the metal compounds in water and impregnating the alumina with the water solution. The solids were dried and calcined as in Example 1.

EXAMPLE 5

In a suitable reactor, a mixed pre-calcined base of 80% gamma-alumina and 20% crystalline aluminosilicate which had been subjected to steaming was mixed with a solution of $H_2PtCl_6 \cdot 6H_2O$, $IrCl_3 \cdot 3H_2O$ and $HAuCl_4 \cdot 3H_2O$ in DMSO under vacuum as in Example 3. The mixture was refluxed and the resulting solids were treated as in Example 1. The catalyst consisted of mixed base containing 0.35% platinum, 0.05% iridium and 0.1% gold.

EXAMPLE 6

A preformed platinum on eta-alumina (0.35% platinum) was mixed with a DMSO solution of $IrCl_3 \cdot 3H_2O$ and $HAuCl_4 \cdot 3H_2O$ and the mixture was refluxed as in Example 1. Sufficient iridium and gold solutes were present to provide 0.1% of each metal in the final catalyst. The solids were filtered off and washed, dried and calcined as in Example 1. The final product contained 0.35% platinum, 0.1% iridium and 0.1% gold.

The products of this invention were used as catalysts in the reforming of a $C_6$-200°F naphtha. These catalysts as well as a commercial platinum-rhenium/alumina (such as referred to in U.S. Pat. No. 3,661,769, column 4, line 33) were employed to reform the feedstock under the following conditions:

| Catalyst | Commercial | Ex. 1 | Ex. 2 | Ex. 3 | Ex. 4 |
|---|---|---|---|---|---|
| Pressure, psig. | 200 | 200 | 200 | 200 | 200 |
| $H_2$/HC, mole ratio | 15/1 | 15/1 | 15/1 | 15/1 | 15/1 |
| Temperature, °F. | 900 | 900 | 900 | 900 | 900 |
| LHSV | 4 | 18 | 20 | 10 | 4 |

-continued

| Catalyst | Commercial | Ex. 1 | Ex. 2 | Ex. 3 | Ex. 4 |
|---|---|---|---|---|---|
| Chlorine, ppm.* | 1 | 10 | slug | 2 | slug |
| Sulfur, ppm.* | 0 | 5 | 5 | 0 | 0 |
| Catayst Bed, cc. | 1 | 1 | 1 | 0.5** | 1 |

*Chlorine and sulfur are added to reactor as carbon tetrachloride and thiophene or carbon disulfide, either continuously to obtain the designated ppm. in the effluent or in a single amount of about 30 to 50. One ppm. of chlorine in the effluent is equivalent to about 7.5 ppm. chlorine in the feed.

**Catalyst beds containing less than 1 ppm. of catalyst in this and subsequent runs containing the designated volume of catalyst and Vycor chips diluted to a bed of 1 cc.

TABLE 1

| HC Product | Commercial Catalyst | Ex. 1 Product | Ex. 2 Product | Ex. 3 Product | Ex. 4 Product |
|---|---|---|---|---|---|
| $C_1$ | }1.9 | }1.3 | }1.2 | }2.1 | 1.0 |
| $C_2$ | | | | | |
| $C_3$ | 2.3 | 1.6 | 2.2 | 2.4 | 5.1 |
| i-$C_4$ | 1.6 | 1.2 | 1.6 | 2.0 | 3.0 |
| n-$C_4$ | 1.4 | 1.0 | 1.5 | 1.4 | 3.5 |
| i-$C_5$ | 2.5 | 1.7 | 2.7 | 2.3 | 4.0 |
| n-$C_5$ | 2.3 | 1.9 | 2.9 | 2.3 | 3.4 |
| 2,2DMC$_4$ | 2.5 | 1.6 | 1.2 | 1.0 | 1.8 |
| 2,3DMC$_4$, 2MC$_5$ | 13.5 | 12.3 | 13.8 | 14.3 | 11.5 |
| 3MC$_5$ | 7.9 | 7.3 | 8.3 | 8.1 | 7.2 |
| n-$C_6$ | 11.2 | 12.0 | 13.1 | 13.2 | 8.7 |
| 2,2DMC$_5$ | — | — | — | 0.1 | 0.7 |
| 2,4DMC$_5$, MCP | 2.8 | 4.8 | 2.6 | 6.1 | 1.4 |
| BENZENE | 16.3 | 14.9 | 15.2 | 12.2 | 13.3 |
| 3,3DMC$_5$ | 0.5 | 0.6 | — | .4 | 0.5 |
| 2MC$_6$ | 3.4 | 3.8 | 3.5 | 4.6 | 3.8 |
| 2,3DMC$_5$ | 1.3 | 1.4 | 1.2 | 1.5 | 1.3 |
| 3MC$_6$ | 4.2 | 4.7 | 4.5 | 5.2 | 4.7 |
| 3EtC$_5$, DMCyC$_5$ | 0.7 | 1.3 | — | 2.1 | 0.4 |
| n-$C_7$ | 3.1 | 4.0 | 3.7 | 4.2 | 3.5 |
| Toluene | 20.6 | 22.6 | 20.7 | 14.5 | 18.4 |
| T.O.S. (HRS) | 20 | 26 | 503 | 132 | 70 |
| $C_5^+$ Yield (Wt.%) | 92.8 | 94.9 | 93.5 | 92.1 | 84.6 |
| R+O ($C_5^+$) | 80.6 | 80.8 | 80.0 | 73.5 | 79.4 |
| LHSV | 4 | 18 | 22 | 10 | 4 |
| Δ Yield at 80.6 R+O, wt.% | — | +2.5 | +0.1 | −5.9 | −7.4 |
| Δ Activity at 80.6 R+O, °F. | — | +31 | +30 | −26 | −7 |

In the above table, the term "Δ Yield" refers to the difference in the $C_5^+$ yield for the commercial catalyst and those of the examples at the octane number of each of the catalysts of this invention. The term "Δ Activity" refers to the difference in temperature required by the commercial catalyst and the catalysts of this invention to reach a given octane number. The higher activity is indicated by a positive number.

These catalysts were also used on the same feedstock at 930°F. The following results were obtained:

TABLE 2

| | Commerical Catalyst | Ex. 1 Product | Ex. 2 Product | Ex. 3 Product | Ex. 4 Product |
|---|---|---|---|---|---|
| LHSV | 4 | 18 | 22 | 10 | 4 |
| Catalyst Bed, cc. | 1 | 1 | 1 | 0.5 | 1 |
| R + 0 ($C_5^+$) | 85.3 | 87.8 | 86.3 | 78.5 | 86.3 |
| Δ Yield* | — | +1.0 | 0 | −7.6 | −7.6 |
| Δ Activity* | — | +46 | +41 | −25 | +6 |
| $C^5$ + Yield, wt.% | 87.3 | — | — | — | — |

*At 85.3 R + 0

The products of Examples 2 and 4 were used in the reforming of a $C_6$-200°F. naphtha containing from 5 to 10 ppm. of sulfur, at 200 psig. and the R + O was tracked over a variety of temperatures. For comparison purposes, the commercial catalyst was used to reform the same stock, but containing only 1 to 2 ppm of sulfur. The R + O results were as follows:

TABLE 3

| Temp. °F | Commercial Catalyst | Example 2 Product | Example 4 Product |
|---|---|---|---|
| 850 | 73.6 | — | — |
| 880 | 76.0 | — | — |
| 900 | 77.5 | 78.7 | — |
| 930 | 81.8 | 84.0 | 82.5 |
| 950 | 86.5 | 89.3 | 84.5 |
| 970 | — | — | 89.0 |
| LHSV | 4 | 18 | 4 |
| Sulfur, ppm | 1–2 | 5–10 | 5 |

At over 4 times the LHSV, and 5 times the sulfur level, the Example 2 product is still more effective in reforming than the commercial catalyst, the activity advantage being about 10°F. Even the product of Example 4 performs in a manner substantially as effective as the commercial catalyst at the higher sulfur level.

The products of Examples 5 and 6 have also been used in the reforming of the $C_6$-200°F. naphtha feedstock. The following results were obtained, using as a comparison the results of the commercial platinum-rhenium on gamma-alumina catalyst:

TABLE 4

|  | Commercial Catalyst | Ex. 5 Product | Ex. 6 Product |
| --- | --- | --- | --- |
| Pressure, psig. | 200 | 200 | 200 |
| Reaction Temp. °F. | 900 | 900 | 900 |
| LHSV | 4 | 10 | 20 |
| Catalyst Bed, cc. | 1 | 0.5 | 0.25 |
| Sulfur in effluent, ppm. | 0 | 0 | 10 |
| Chlorine in effluent, ppm. | 1 | 2 | 3 |
| $C_5$ + Yield, wt. % | 93.6 | — | — |
| R + O ($C_5^+$) | 80.6 | 79.3 | 80.2 |
| Δ Yield, wt. %* | — | +0.9 | −3.0 |
| Δ Activity, °F.* | — | +9 | +30 |

*At 80.6 R + O ($C_5^+$)

It may thus be seen that the catalysts of this invention, particularly those prepared by the DMSO-reflux method, are selective, stable and active materials in the reforming of hydrocarbon feedstocks to provide gasoline, even under severe operating conditions, such as high LHSV and sulfur-containing feed.

While this invention has been described by illustration with specific examples, we contemplate other uses and modifications known in the industry which would be applicable thereto and would thus fall within the scope of the invention and of the following claims:

We claim:

1. A reforming catalyst comprising a solid porous support containing platinum, iridium and gold, said catalyst being prepared by the process of applying to the said support a dimethylsulfoxide solution containing soluble compounds of the metals, selected from the group consisting of metal salt, metal acid, metal ammine and metal ammine halide, drying the resulting solids and calcining.

2. The catalyst of claim 1 wherein the solid porous support is an inorganic oxide.

3. The catalyst of claim 2 wherein the inorganic oxide is alumina.

4. The catalyst of claim 2 wherein the porous support is a mixture of alumina and an aluminosilicate.

5. The catalyst of claim 1 wherein the said compounds of the metals are joined with the solid porous support by dissolving said compounds of the metals in dimethylsulfoxide, mixing the dimethylsulfoxide solution with the solid porous support, heating the resulting slurry, recovering the solids therefrom, drying the solids and calcining.

6. The catalyst of claim 5 wherein the recovered solids are washed first in dimethylsulfoxide and then in water prior to said drying and calcining.

7. A process for the preparation of the catalyst of claim 1 comprising mixing the solid porous support with a solution of the said soluble metal compounds in dimethylsulfoxide, subjecting the resulting slurry to refluxing, separating the solids from the slurry, drying the solids and calcining.

8. The process of claim 7 wherein the soluble metal salts are chloroplatinic acid, iridium chloride and aurichloric acid.

* * * * *

UNITED STATES PATENT AND TRADEMARK OFFICE
CERTIFICATE OF CORRECTION

PATENT NO. : 3,981,825
DATED : September 21, 1976
INVENTOR(S) : WILLIAM J. REAGAN and NAI Y. CHEN It is certified that error appears in the above-identified patent and that said Letters Patent are hereby corrected as shown below:

Column 2, line 67, "in" second occurrence should read -- is --.

Column 3, line 17, "as well as the" should be --as well or the--.

Column 3, line 22, "DMSO-composition" should be --DMSO-decomposition--.

Column 5, Table I, Column Ex. 4 Product, item 2, "5.1" should be --2.8--.

Signed and Sealed this

Twenty-eighth Day of December 1976

[SEAL]

Attest:

RUTH C. MASON
Attesting Officer

C. MARSHALL DANN
Commissioner of Patents and Trademarks